Nov. 25, 1969     G. GROSBARD     3,480,811
MAGNETIC ACCELERATOR
Filed June 17, 1966     2 Sheets-Sheet 1
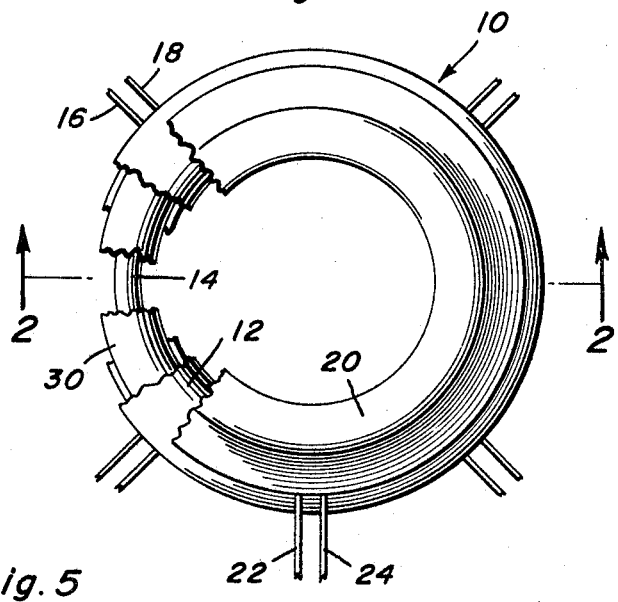
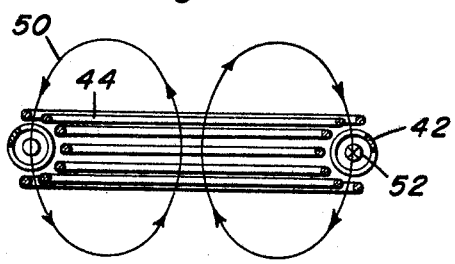
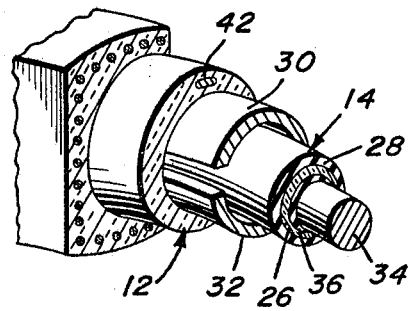
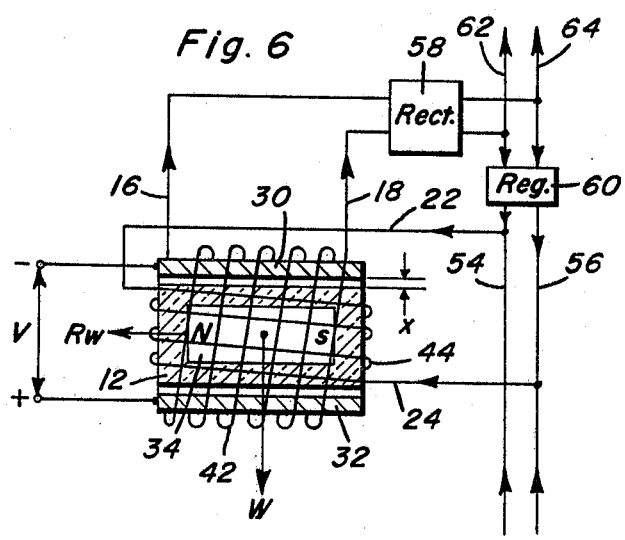
Gregory Grosbard
INVENTOR.

Nov. 25, 1969 G. GROSBARD 3,480,811
MAGNETIC ACCELERATOR
Filed June 17, 1966 2 Sheets-Sheet 2
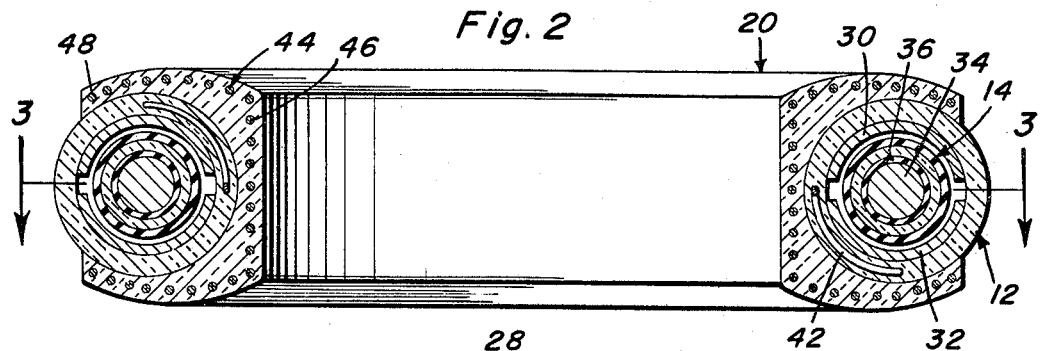
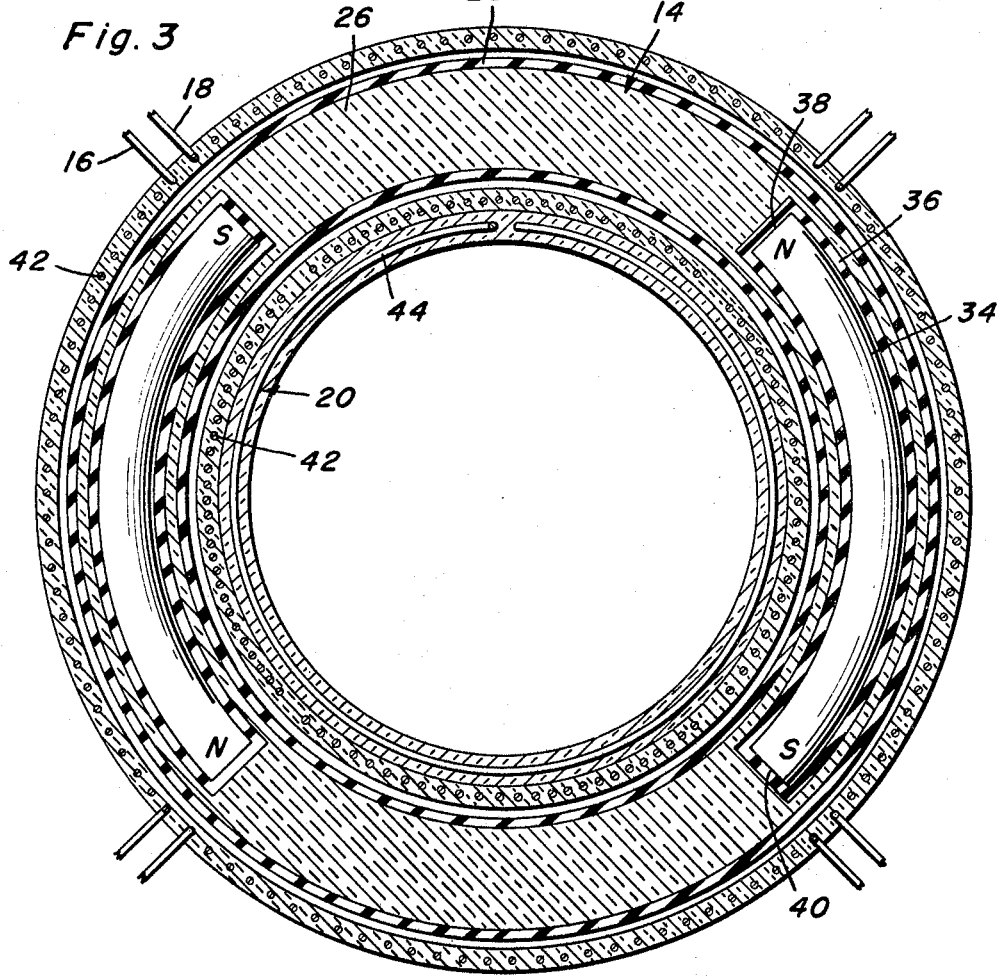
Gregory Grosbard
INVENTOR.

United States Patent Office
3,480,811
Patented Nov. 25, 1969

3,480,811
MAGNETIC ACCELERATOR
Gregory Grosbard, El Paso, Tex., assignor of fifteen and one-fourth percent each to Francis R. Salazar and Max Brooks, both of Denver, Colo., and two and one-half percent to Texas S. Ward, El Paso, Tex.
Filed June 17, 1966, Ser. No. 558,465
Int. Cl. H02k 17/00
U.S. Cl. 310—156
18 Claims

ABSTRACT OF THE DISCLOSURE

An annular rotor is accelerated to or decelerated from rotational movement at a constant speed corresponding to some energy level by an input or withdrawal of electrical energy through electromagnetic coils to thereby convert energy between electrical and kinetic forms. Energy is stored in kinetic form by electromagnetically maintaining the rotor rotating at a substantially constant speed while it is supported or suspended by anti-friction means within a toroidal shell.

---

This invention relates to an energy converter and more particularly to a device through which energy may be converted from kinetic to electrical energy or electrical energy stored in the form of kinetic energy.

The present invention provides a basic method and arrangement for storing electrical energy by electromechanical means. This is accomplished by electromagnetically accelerating an annular rotor completely enclosed within a toroidal shell, the rotor embedding therewithin a plurality of angularly spaced magnets moved at a predetermined speed through a plurality of solenoid coils which are mounted on the toroidal shell in encircling relation to the rotational path of the rotor. Thus, the electrical voltage induced in the solenoid coils by movement of the magnets therethrough, provide a source of electrical energy from which electromagnetic means may be energized in order to maintain the rotor moving at the proper speed. Energy supplied to the device from an external source through the rotor encircling solenoid coils may thereby be converted into kinetic energy manifested by initiating or increasing the rotation of the rotor which is decelerated in response to withdrawal of electrical energy from the device.

In carrying out the objectives of the present invention, the energy converter is unique in that the annular rotor is completely enclosed within the toroidal shell and may be suspended therein for rotation with little or no frictional resistance. Acceleration of the rotor in a radial direction to maintain rotational movement will be effected by an electromagnetic coil geometrically related to the toroidal configuration of the shell as to produce a magnetic field which intersects the rotor at right angles to its plane of movement and without therefore interfering with the magnetic field of the solenoid coils extending through the angular portions of the rotor within which the magnets are embedded.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view with parts broken away of an energy converter device constructed in accordance with the present invention.

FIGURE 2 is an enlarged sectional view taken substantially through a plane indicated by section line 2—2 in FIGURE 1.

FIGURE 3 is a sectional view taken substantially through a plane indicated by section line 3—3 in FIGURE 2.

FIGURE 4 is a partial breakaway perspective view of a portion of the energy converter shown in FIGURES 1 through 3.

FIGURE 5 is a coil and magnetic flux diagram associated with the device of the present invention.

FIGURE 6 is a simplified electrical circuit diagram associated with the device of the present invention.

Referring now to the drawings in detail, FIGURE 1 illustrates a typical energy converting device constructed in accordance with the present invention which is generally denoted by reference numeral 10. The device 10 is generally toroidal in shape and is provided with a toroidal shell generally referred to by reference numeral 12 within which a solid, annular rotor or circular ring assembly 14 is completely enclosed for rotation about a central axis of the toroidal shell 12, perpendicular to the plane of the paper as illustrated in FIGURE 1. Accordingly, the rotor 14 will rotate about this central axis in a rotational plane which intersects the toroidal shell. In addition to completely enclosing the annular rotor 14, the toroidal shell also mounts solenoid coil means electrically terminating at a plurality of angularly spaced terminal pairs 16 and 18 from which alternating current outputs are obtained. Also fixedly mounted on the toroidal shell, is an electromagnetic motor winding generally referred to by reference numeral 20 to which a DC voltage is supplied through the terminals 22 and 24.

Referring now to FIGURES 2, 3 and 4, it will be observed that the annular rotor 14 is solid in cross-section and is made of an electrostatically charged material 26 externally coated with an ion insulator 28. An electrostatic charge on the rotor is distributed in any suitable manner, forming no part of the present invention, so that the rotor will be suspended between the oppositely charged electrode plates 30 and 32 which are fixedly mounted internally of the toroidal shell 12 in spaced relation to each other and to the rotor. Thus, the rotor will be upwardly attracted toward plate 30 because of its electrostatic charge opposite in polarity to that of plate 30, for example, and repelled by the similarly charged plate 32. The coating 28 on the rotor will insulate it from its surroundings to prevent its charge from flowing away. It will therefore be apparent that the electrostatic electrodes 30 and 32 may be charged by a voltage applied thereacross sufficient to just overcome any gravitational pull exerted on the rotor so that it may be suspended within any gas or vacuum enclosed by the toroidal shell. In this manner, the annular rotor 14 may be rotated with substantially no frictional resistance. It will of course be appreciated that other anti-gravity means may be utilized so as to suspend the rotor in out-of-contact relation to its enclosing shell as well as other rotational bearing support facilities. Further, the electrostatic suspension arrangement per se and associated controls form no part of the present invention. Electrostatic suspension arrangements of gyroscope rotors, for example, are well known as disclosed in U.S. Patent No. 3,221,-563. It will also be apparent that the anti-gravity facilities for suspending the rotor within its shell may be obviated where substantially no gravitational pull is being experienced.

Embedded within the solid annular rotor 14, are a plurality of permanent magnets such as the two angularly spaced, arcuate magnets 34 externally coated by ion insulators 36. The opposite pole faces 38 and 40 of the magnets are equally spaced from each other so as to angularly divide the rotor into four segments, each segment having poles of opposite polarity at the opposite ends thereof. Although two magnets 34 and hence four rotor segments are shown in FIGURE 3, it will be appreciated that the rotor may be similarly divided into any number of rotor segments as desired.

Associated with the solenoid coil means embedded within the toroidal shell 12, are a plurality of separate helically wound coils 42 encircling the toroidal chamber formed by the shell 12. The number of helical coils equals the number of rotor segments into which the rotor is divided by the permanent magnets embedded therein, each helical coil being electrically terminated at a pair of terminals 16 and 18 as aforementioned so that an alternating voltage will appear across each pair of terminals as the rotor is rotated about the central axis causing the magnets to sequentially pass through each helical coil.

The rotor is accelerated insofar as its continuously changing direction is concerned so that it may rotate in its circular path at a constant angular speed in order to establish a predetermined AC output from the solenoid coils at the terminal pairs 16 and 18. Toward this end, the electromagnetic motor winding 20 is fixedly mounted externally on the toroidal shell 12 and includes a continuous conductor coil 44 electrically terminated at the pair of terminals 22 and 24 as aforementioned. The coil 44 is wound about the central axis of the toroidal shell having a coil portion 46 of minimum diameter less than the diameter of the rotor and the toroidal shell at the rotational plane of the rotor. The motor winding coil extends axially in opposite directions beyond the toroidal shell to form axially outer coil portions 48 of maximum diameter. In this fashion, the coil 44 envelopes a substantial part of the toroidal shell exposing only the radially outer portion thereof from which the terminals 16 and 18 of the solenoid coils 42 extend.

It is well known that DC current conducted through a coil establishes a magnetic field characteristized by flux lines leaving or entering poles at the opposite axial ends of the coil. The shape of coil 44 as shown as such as to concentrate the flux lines externally of the coil in intersecting relation to the body of the rotor 14 with a minimum amount of magnetic energy loss. As the rotor body moves through the magnetic field, cutting its lines of flux, internal circulating current is induced therein resulting in the generation of an accelerating force in a radially inward direction mutually perpendicular to the flux lines from coil 44 and the current flow direction at any location on the rotor. The magnitude of the radially directed forces will depend upon the flux density of the strength of the magnetic field as is well known, which in turn depends upon the current conducted through coil 44. Therefore, by appropriately regulating the DC current through coil 44, rotation of the rotor may be sustained at any desired speed.

As diagrammatically shown in FIGURE 5, the motor coil 44 established flux paths 50 which extend axially along the central axis of the toroidal shell in one direction and axially in the opposite direction through the rotor 14 itself through which magnetic flux paths 52 are established by the solenoid coils 42. Thus, the magnetic fields respectively associated with the coils 42 and 44 intersect at right angles to each other within the rotor so as to cooperate therewith in a non-interfering manner.

As schematically shown in FIGURE 6, a DC voltage is supplied to the electromagnetic motor coil winding 44 from the DC voltage supply lines 54 and 56 so as to accelerate (to directionally change the velocity vector) the rotor for movement at a constant angular speed $(w)$ or constant linear speed $(Rw)$ in a circular path. The accelerating force necessary to maintain the rotor rotating at this constant angular speed may be calculated from the well-known relationship $F=mRw^2$. Thus, the DC voltage applied to the motor winding coil 44 necessary to maintain rotation of the rotor may be determined from well-known motor relationships where the force (F) is established as a function of rotor speed $(w)$. It will also become apparent that as long as no energy is withdrawn from the system, the DC voltage supplied to the motor coil 44 may be obtained from the output voltage of the solenoid coils assuming there are no energy losses. Accordingly, the output terminals 16 and 18 of the terminal coils may be connected to a voltage rectifier 58 as diagrammatically shown in FIGURE 6, the DC output of which is connected to the power supply lines 54 and 56 through a voltage regulator 60. Rectification of the output voltage from the solenoid coils is of course necessary because of alternating current produced of constant frequency as the poles of opposite polarity of the magnets 34 sequentially pass through each solenoid coil 42. Thus, the energy converter may be maintained in a balanced condition with the rotor thereof rotating thereby storing energy in kinetic form with substantially no loss of energy. Of course, any impedance losses, energy transformation losses, magnetic energy losses and rectifier losses that may exist must either be made up by external supply of electrical energy to the power lines 54 and 56 or by a reduction in the energy stored. Where the rotor is experiencing a gravitational pull, this may be compensated for to minimize frictional losses as aforementioned by applying a voltage (V) across the electrode plates 30 and 32 so as to establish electrostatic charges thereon of opposite polarity overcoming the gravitation pull (W) for a given plate separation $(x)$.

The arrangement and operation of the energy converter will be apparent from the foregoing description. It will be appreciated therefore, that electrical energy may be stored by the converter by initiating movement of the rotor. This may of course be accomplished by supplying electrical energy to the power lines 54 and 56 from an external source in order to accelerate the rotor up to the speed at which the device is designed to operate. The rotor will be maintained rotating at this speed without any further energy being supplied until energy is withdrawn by means of the output lines 62 and 64 as shown for example in FIGURE 6. Other means may also be associated with the energy converter for supplying energy to the converter. For example, by radio triggered means the rotor may acquire kinetic energy for subsequent conversion into electrical energy. Thus, the energy converter of the present invention will be useful for many purposes and in different installations.

To summarize operation of the described device, let it be assumed that the annular rotor 14 is stationary but supported for free rotation by any suitable anti-friction means within the toroidal shell 12. If electrical energy is then introduced by applying a DC voltage across lines 54 and 56, a magnetic field will be established by coil 44 interlinked with the rotor. Current will also be supplied through rectifier 58 to the coils 42 to initiate movement of the rotor by generating magnetic fields coacting with the magnets 34 in the rotor, unless the rotor has stopped in some dead center position. Once movement of the rotor begins, it continues because of the radially inward accelerating force developed by initial movement of the rotor through the magnetic field of coil 44, which force is greater than that necessary to sustain rotation of the rotor at speeds below a value corresponding to a predetermined amount of input energy. Thus, the rotational speed of the rotor increases until the predetermined amount of electrical energy has been introduced. The rotor will then continue to rotate at the speed it has attained without any continued energy input, disregarding losses as aforementioned, because of the AC output from coils 42 being transformed by rectifier 58 and supplied through regulator 60 as a DC voltage to coil 44 for maintaining its magnetic field. Withdrawal of electrical energy from the system either through lines 62 and 64 or because of losses, will be occasioned by a decrease in speed of the rotor to a value corresponding to a lower level of energy stored in the system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a device for converting between kinetic and electrical energy, an annular rotor having a central axis, magnetic means embedded in said rotor for establishing angularly spaced poles of opposite polarity therein, solenoid coils means mounted about said rotor for conducting alternating current in response to rotation of said rotor at a predetermined speed about said axis in a plane perpendicular thereto, electromagnetic winding means mounted in operative relation to said central axis for establishing a magnetic field perpendicular to said plane and intersected by the rotor, and supply means connected to said winding means for regulating the magnetic field to maintain the rotor rotating at said predetermined angular speed.

2. The combination of claim 1 including toroidal bearing support means establishing an anti-friction path of movement for said rotor.

3. The combination of claim 2 wherein said electromagnetic winding means comprises a continuous conductor coil extending axially in opposite directions along said central axis from the plane of movement, said coil having a minimum diameter less than the rotor at the plane of movement increasing to maximum diameters greater than the diameter of the rotor on opposite axial sides thereof.

4. The combination of claim 3 wherein said solenoid coil means comprises a plurality of helical coil segments concentrically wound about the annular rotor to form a toroidal envelope, said coil segments being equal in number to the number of poles in the rotor.

5. The combination of claim 4 including rectifying means operatively connecting the coil means to the supply means for supplying DC current to the electromagnetic winding means.

6. The combination of claim 1 wherein said electromagnetic winding means comprises a continuous conductor coil extending axially in opposite directions along said central axis from the plane of movement, said coil having a minimum diameter less than the rotor at the plane of movement increasing to maximum diameters greater than the diameter of the rotor on opposite axial sides thereof.

7. The combination of claim 6 wherein said solenoid coil means comprises a plurality of helical coil segments concentrically wound about the annular rotor to form a toroidal envelope, said coil segments being equal in number to the number of poles in the rotor.

8. The combination of claim 1 wherein said solenoid coil means comprises a plurality of helical coil segments concentrically wound about the annular rotor to form a toroidal envelope, said coil segments being equal in number to the number of poles in the rotor.

9. The combination of claim 8 including rectifying means operatively connecting the coil means to the supply means for supplying DC current to the electromagnetic winding means.

10. The combination of claim 1 including rectifying means operatively connecting the coil means to the supply means for supplying DC current to the electromagnetic winding means.

11. The combination of claim 10 including toroidal bearing support means establishing an anti-friction path of movement for said rotor.

12. An energy converter comprising a toroidal shell, an annular rotor completely enclosed with said shell for rotation about a central axis of the shell, electromagnetic means fixedly mounted on said shell for maintaining said rotor rotating at a substantially constant angular speed about the central axis, and magnetic coupling means mounted in non-interfering relation to the electromagnetic means for generating electrical energy which is supplied to the electromagnetic means in response to rotation of the rotor.

13. The combination of claim 12 wherein said electromagnetic means and said magnetic coupling means generate magnetic fields intersecting each other at right angles within the rotor.

14. The combination of claim 13 wherein said magnetic coupling means comprises, a plurality of magnets embedded in angularly spaced relation within the rotor, and a plurality of solenoid coils fixedly mounted on the toroidal shell encircling the rotational path of the rotor.

15. The combination of claim 14 wherein the electromagnetic means comprises a continuous conductor coil extending axially in opposite directions along said central axis, said coil having a minimum diameter less than the rotor increasing to maximum diameters greater than the diameter of the rotor on opposite axial sides thereof.

16. The combination of claim 12 wherein the electromagnetic means comprises a continuous conductor coil extending axially in opposite directions along said central axis, said coil having a minimum diameter less than the rotor increasing to maximum diameters greater than the diameter of the rotor on opposite axial sides thereof.

17. The combination of claim 12 including anti-gravity means mounted by the shell for suspension of the rotor in out-of-contact relation to the shell.

18. The combination of claim 17 wherein said electromagnetic means and said magnetic coupling means generate magnetic fields intersecting each other at right angles within the rotor.

References Cited

UNITED STATES PATENTS

| | | | |
|---|---|---|---|
| 3,289,017 | 11/1966 | Klass et al. | 310—2 |
| 3,041,482 | 6/1962 | Beams | 310—2 |
| 3,400,282 | 9/1968 | Felici | 310—6 |
| 3,338,644 | 8/1967 | Atkinson et al. | 308—10 |
| 3,143,704 | 8/1964 | Wright | 308—10 XR |
| 3,221,563 | 12/1965 | Wing | 308—10 XR |
| 2,914,688 | 11/1959 | Matthews | 310—166 XR |
| 3,178,600 | 4/1965 | Bers | 310—166 |
| 1,231,193 | 6/1917 | Powers. | |

MILTON O. HIRSHFIELD, Primary Examiner

B. A. REYNOLDS, Assistant Examiner

U.S. Cl. X.R.

308—10; 310—165, 177, 262, 273; 318—116